H. BULL.
MOSQUITO NET SUPPORT.
APPLICATION FILED OCT. 22, 1907.
903,539.
Patented Nov. 10, 1908.
2 SHEETS—SHEET 2.
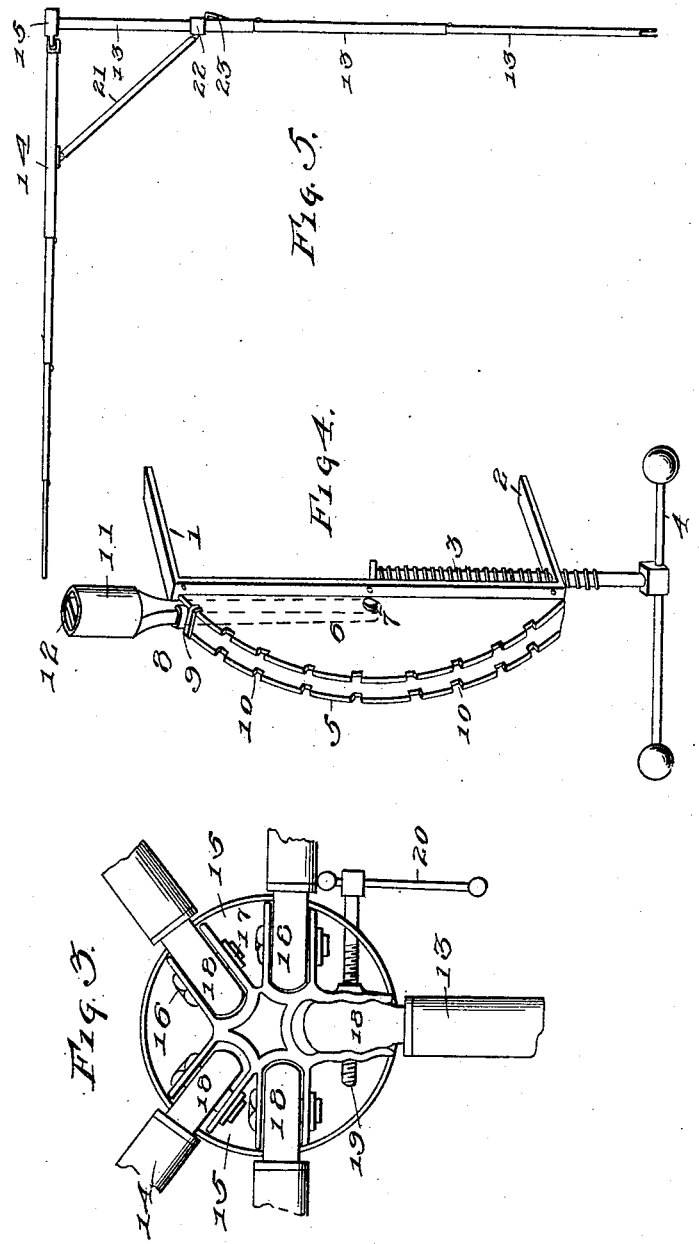
Inventor
Harald Bull.
Witnesses
J. E. Ballard
By
Attorney

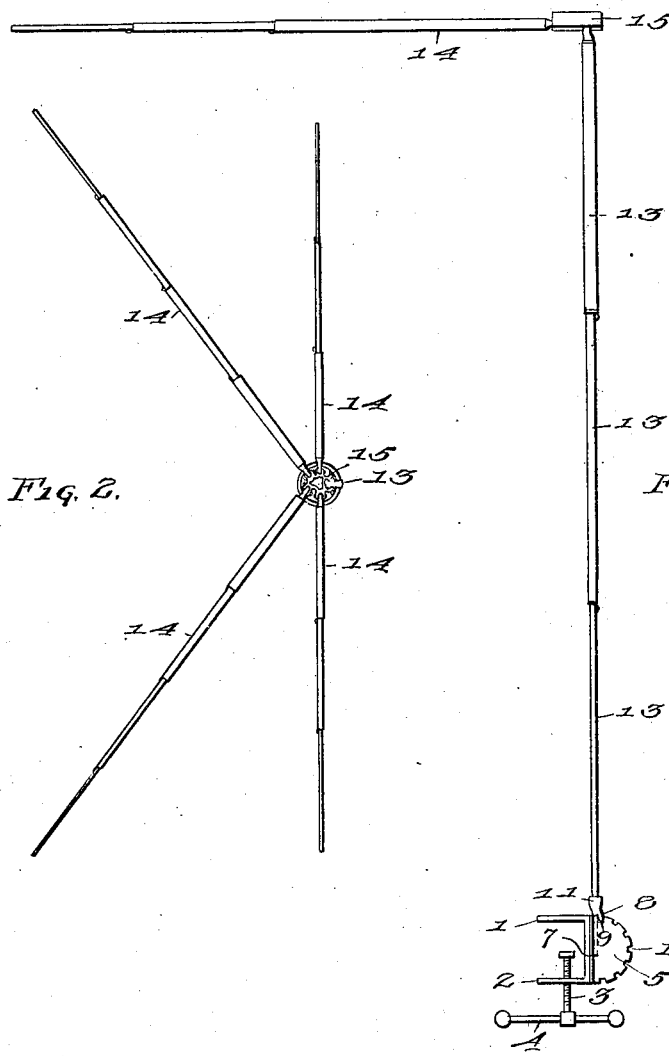

UNITED STATES PATENT OFFICE.

HARALD BULL, OF MEXICO, MEXICO.

MOSQUITO-NET SUPPORT.

No. 903,539.  Specification of Letters Patent.  Patented Nov. 10, 1908.

Application filed October 22, 1907. Serial No. 398,653.

*To all whom it may concern:*

Be it known that I, HARALD BULL, manufacturer, a subject of the King of Norway, residing at Mexico city, Republic of Mexico, have invented certain new and useful Improvements in Mosquito-Net Supports; and I do hereby declare the following to be a full, clear, and exact description of the invention, such as will enable others skilled in the art to which it appertains to make and use the same.

My invention relates to improvements in mosquito-net supports its object being to obtain a portable support for mosquito-net of small volume which may be easily put up or taken apart. I obtain these results by means of the arrangement shown in the annexed drawings, in which Figure 1 is a side view of the invention; Fig. 2 is a plan view, looking from above, of the same; Fig. 3 is a plan view in detail of the upper part, or rather of the point of union; Fig. 4 is a perspective view of the clamp; and Fig. 5 is a side view of a modification of the support.

With reference to the drawings, 1 and 2 are arms of the clamp, which are put on the place where it is desired to fix the support, for example, on the side of a bed, fixing the clamp firmly by means of a screw 3 having its corresponding tightening nut together with the cross-lever 4 by which the tightening nut, that controls the clamp, is made to turn round; riveted to the body of the clamp we have a toothed segment formed of arcuate plates 5 and 6 united to each other by a rivet 7, which acts as an axis for bar 8 which oscillates between the plates, this bar 8 has a movable hasp 9 at its lower end which coöperates with the teeth, holding the bar 8 in the desired position of adjustment. Bar 8 has a socket or ferrule 11 on its upper end, inside which is placed a fixed pin 12, the extremity of the perpendicular post 13 hooks on to this pin by means of a suitable slot thus preventing from turning round at its joint with the clamp; the said perpendicular post also has telescoped sections provided with spring stops which enter into grooves on the sections to prevent it from coming down and also to prevent it from turning round; the point of union which carries the horizontal arms 14 is attached to the top of the post. The point of union is made, as shown in Fig. 3, by means of a hub having a slotted flange. The horizontal arms 1 which are pivotally attached to the upper side of the hub descend into the slots until they rest on their edges or on the face of the hub; the said hub 15 has one of its slots so arranged that the hub can be let down until it is in a perpendicular position; each of the horizontal arms turns on its corresponding screw 16, which acts as an axis, and is firmly fixed at the end by a nut 17. Post 13 turns on a large screw 19 and it may be tightened in the position desired by screw 19 and its cross lever 20. The two sides of the extremity 18 of post 13 have circular grooves, these grooves correspond to projecting circular rims on the hub, so as to increase the contacting surface and to give it a greater power of resistance.

In Fig. 5 is shown a modification of the supporting post, and its horizontal arms kept in position by means of stays 21, one of the ends of which is secured to the horizontal arms, and its other end to a ring 22 which is freely moved on post 13 and is kept in position by a spring 23, it being possible to use this modification in combination with the clamp in order to fix the apparatus. All the mechanism can be taken apart reducing it to two pieces—the arms and the post together with the point of union or hub, and the clamp—and it is understood that the arms and the post can be made with two or more sections as most convenient and this may be done without departing from the spirit of the invention.

It will now be understood that by fastening the clamp to the bed side extending the arms until they rest upon the edge of the hub, and causing the post 13 to be fixed into the socket 11, the horizontal arms 14 will be made to provide a support as illustrated in Fig. 2, to which the mosquito-net may be fastened. The Fig. 1 which is a side view of the support composed of 4 horizontal arms 14 may also illustrate a modification by which the support only consists of the post and one horizontal arm 14, in which case the post by means of the clamp is fastened to the end of the bed and the sole horizontal arm then forms a rectangle with the post, upon which arm the mosquito-net is fastened so as to form a pyramidal mosquito-bar. By closing the arms after the style of a tripod or umbrella, and shutting up the telescoped sections the whole of the apparatus can be packed into a parcel of small size.

Having thus fully described my invention, what I claim is the following:

In a canopy frame, a clamp, toothed segments carried thereby, a post pivotally mounted to swing about an axis in the center of the segments, a pawl carried by the post coöperating with the teeth of the segments to hold the post in adjusted position, a hub on the post and radial arm or arms pivoted to the hub to swing into position parallel to the post, or to rest horizontally on the hub disposed radially thereof.

In testimony whereof, I affix my signature, in presence of two witnesses.

HARALD BULL.

Witnesses:
J. GRANDJEAN,
RAOÚL FIGUEROA.